United States Patent

[11] 3,616,125

[72] Inventor Charles E. Bowling
Speedway, Ind.
[21] Appl. No. 34,369
[22] Filed May 4, 1970
[45] Patented Oct. 26, 1971
[73] Assignee General Motors Corporation
Detroit, Mich.

[54] AIRFOIL STRUCTURES PROVIDED WITH COOLING MEANS FOR IMPROVED TRANSPIRATION
8 Claims, 7 Drawing Figs.
[52] U.S. Cl. .................................................. 161/53,
29/191, 161/114, 277/26, 277/96, 416/90,
416/231
[51] Int. Cl. ...................................................... B32b 3/06
[50] Field of Search ........................................ 161/112-115,
53; 277/53, 96, 26; 29/191; 416/231, 90

[56] References Cited
UNITED STATES PATENTS

| | | | |
|---|---|---|---|
| 3,554,663 | 1/1971 | Helms | 416/90 |
| 2,879,028 | 3/1959 | Stalker | 416/90 |
| 3,411,794 | 11/1968 | Allen | 161/112 X |
| 3,527,544 | 9/1970 | Allen | 416/90 |
| 3,190,412 | 6/1965 | Rutter et al. | 29/191 |
| 3,529,905 | 9/1970 | Meginnis | 277/96 X |

Primary Examiner—Philip Dier
Attorneys—Paul Fitzpatrick and Jean L. Carpenter

ABSTRACT: An airfoil has a structural core and a facing mounted on the core. The facing is in at least two layers with structure which defines cavities between these layers and holes through the layer nearest the core. Headed buttons trapped in the holes with stems extending through the holes are fixed to the core to retain the facing on the core. These buttons are mounted in the facing with some clearance so that relative expansion of the core and facing may occur. The facing may be porous. The core may include special provisions for bringing cooling air to the facing.

PATENTED OCT 26 1971　　3,616,125

INVENTOR.
Charles E. Bowling
BY
Paul Fitzpatrick
ATTORNEY

AIRFOIL STRUCTURES PROVIDED WITH COOLING MEANS FOR IMPROVED TRANSPIRATION

The invention herein described was made in the course of work under a contract or subcontract thereunder with the Department of Defense.

DESCRIPTION

My invention is directed to laminated high-temperature resisting structures and to airfoil structures for high-temperature machines such as turbines; particularly to airfoil structures embodying a supporting core and a facing which defines an outer surface of the airfoil. Such airfoils are commonly known as nozzle vanes or rotor blades. In high-temperature turbomachines, various expedients for cooling an airfoil may be required. Also, it may be desirable to provide such an airfoil with a facing of a material which is more resistant to high temperature or to erosion by hot gas and use a central supporting structure such as a core or strut to provide strength for the airfoil to resist aerodynamic and other loads. In the succeeding discussion, such airfoils may be referred to as "blades" and the term will be intended to include vanes and other analogous structures.

My invention is directed to a suitable arrangement for holding a facing on a core or support while allowing some relative expansion between facing and support.

The principal objects of my invention are to improve high-temperature turbomachinery; to provide improved structure of composite blades; to provide a suitable arrangement for strengthening a laminated blade facing while providing for supply of cooling air to flow under or through the facing; to provide a superior means of attaching a laminated sheet to a support; to provide a laminated metal sheet incorporating trapped studs which project from the inner face so as to be attachable to a backing structure or core; and to provide suitable arrangements of attaching members which may be incorporated in a laminated metal structure and project therefrom for bonding to a support. A further object is to provide a mode of attachment of a porous metal sheet which does not undesirably inhibit the flow of cooling air to and through the sheet, and one which is adapted to permit relative expansion.

The nature of my invention and its advantages will be clear to those skilled in the art from the succeeding detailed description and drawings of preferred embodiments of the invention.

FIG. 1 is an axonometric view of a turbine airfoil.

Figure 2:
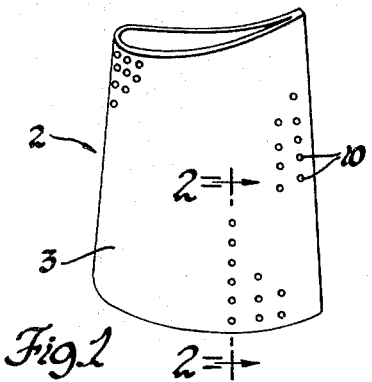
FIG. 2 is an enlarged fragmentary sectional view of the same, taken on the plane indicated by the line 2—2 in FIG. 1.

Referring first to FIGS. 1 and 2, the structure there illustrated is a hollow transpiration cooled airfoil 2 which may be a flow-directing portion of a turbine nozzle or a flow-energized blade of a turbine rotor, for example. The airfoil has an exterior surface defined by a facing 3, the facing being mounted on a hollow core, base, or support 4. The facing of the blade is a laminated material; that is, a sheet made up of two or more layers or laminae of metal bonded together and of a structure which permits flow of cooling air or other gas to the exterior of the airfoil through a great number of closely spaced and widely distributed pores. Cooled airfoil facings of this nature are described in copending applications, of common ownership, as follows: Ser. No. 526,207 for Laminated Porous Metal of Bratkovich and Meginnis, filed Feb. 9, 1966 and Ser. No. 691,834 for Turbine Cooling of Emmerson, filed Dec. 19, 1967; and also in British Pat. No. 1,175,816 for Improvements Relating to Cooling of Aerofoil Shaped Blades published Dec. 23, 1969. Cooling air or gas may be supplied in any suitable manner.

Figure 3:
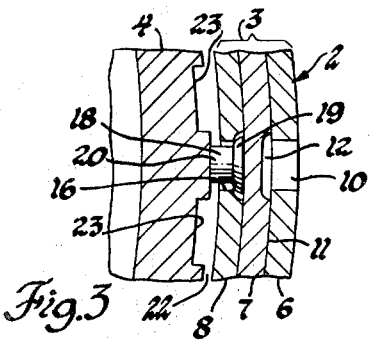
FIG. 3 is an enlarged fragmentary sectional view taken on the plane indicated by the line 3—3 in FIG. 2.
Figure 2:
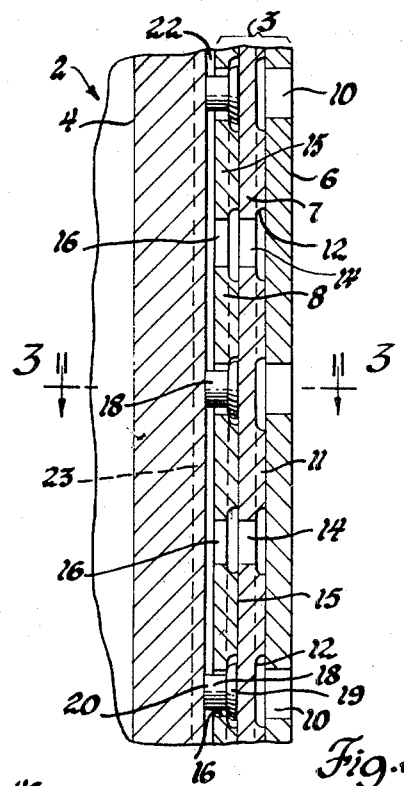

Referring now also to FIGS. 2 and 3, the facing 3 is made of three layers or laminae; an outer layer 6, a middle layer 7, and an inner layer 8. The outer layer 6 bears a multiplicity of pores 10, preferably in a generally rectangular array, distributed over the entire or substantially the entire surface of the airfoil. The middle layer bears bosses 11 which engage the inner surface of the outer layer. Between these bosses the inner layer is recessed as indicated at 12, and holes 14 through the middle layer 7 communicate with the recessed areas and thereby with the pores 10. The inner layer 8 likewise has a pattern of bosses, recesses, and holes so that cooling air can flow from the inside of facing 3 to the layer 7. A boss is indicated at 15 and holes at 16. The pattern of bosses or other surface relief and of holes or pores may be provided by any suitable process, preferably by photochemical etching. The several layers are formed into unitary structure by laying them up in register and bonding them together. In most cases such bonding would preferably be by a process of diffusion bonding, although brazing and other modes may be suitable in some cases. The core 4 is preferably a cast structure and is not necessary hollow, as illustrated, although in most cases a hollow core would be preferred.

The facing 3 is fixed positively to the core 4 by a number of attaching members or buttons 18 each of which has a head 19 and a stem 20, the stem 20 extending through one of the holes 16 and projecting slightly from the inside face of the inner layer 8 when the head abuts the middle layer 7. These buttons are distributed so that buttons are located in only some of the holes 16 so as to allow ample flow of cooling air to the facing 3. For example, the stems 20 may pass through every other hole 16. The buttons 18 are not rigidly fixed or bonded to the facing but have some freedom for movement parallel to the outer surface of the facing and may have a very slight degree of freedom for movement perpendicular to the surface. It is not desired to have much freedom in this direction, since it may lead to flutter of the blade surface.

The buttons 18 are put in the facing before the layers are bonded together. The buttons may be coated with any substance which resist the diffusion bonding or brazing so that they do not adhere to the facing. Since they project slightly from the inner surface of the inner layer 8, they may be pressed against the core by force exerted on the outer surface of the facing. This makes it possible to diffusion bond or braze the buttons to the core. Other modes of attachment such as welding might be employed but are not preferred. Some cooling air may ordinarily enter around each of the buttons 18, but the principal supply of cooling air should be through the holes 16 which are not occupied by the attaching members.

The clearance indicated at 22 between the core and facing may provide a passage for cooling air. However, in many cases it is not desirable for this to be of any considerable width. For this reason, it may be desirable to provide channels 23 in the core for flow of cooling air. If such channels are provided, then some or most of the air holes 16 which are not occupied by buttons may be disposed over the cooling air channels 23.

It will be apparent that this structure provides for a sufficient number of dispersed attachment points to secure the facing reliably to the core while still providing for an appreciable amount of relative growth between the facing and core as a result of differences in temperature or thermal coefficients of expansion.

The buttons 18 shown in FIGS. 2 and 3 are contemplated as being separate individual parts but are not necessarily such and various arrangements for the buttons are possible, depending upon what is desired. They may be in a strip or lattice rather than individual pieces. Also, the heads of the buttons may be elongate or any other shape.

Figure 4:
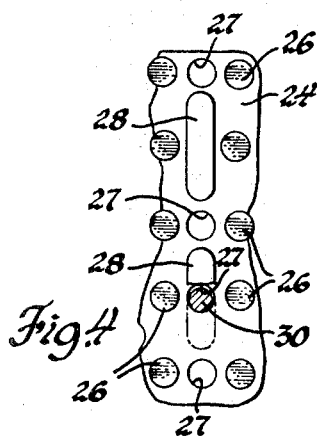
FIG. 4 is a fragmentary view, with parts cut away and in section, of a further form of the invention.

FIG. 4 represents a view of one form of attaching member, being a view looking at the outer surface of the inner layer 8 with the overlying layers of the facing removed. In FIG. 4, the inner layer is identified as 24, there are spaced bosses 26, and an array of holes 27. Attaching members 28 have elongated heads and stems 30 which pass through some of the holes 27 to engage the core.

Figure 5:
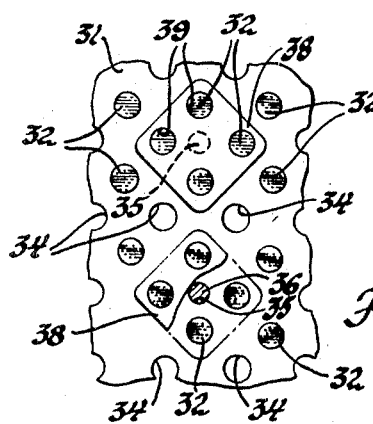
FIG. 5 is a view similar to FIG. 4 of still a further form of the invention.

FIG. 5 illustrates a structure which is generally similar to FIG. 4 so far as the facing is concerned. In FIG. 5 an inner facing layer 31 bears rows of bosses 32 distributed over its surface and holes 34 for entrance of cooling air to the space between the inner and middle layers. There are also holes 35 to receive the stems 36 of attaching members 38. In this form of the device, each attaching member 38 has a roughly rectangular head formed with four openings 39 through which bosses 32 project into engagement with the overlying middle layer 7.

Figure 6:
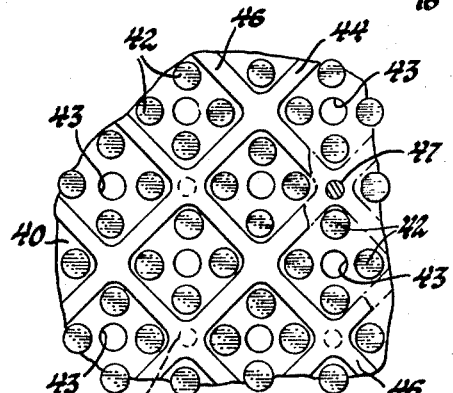
FIG. 6 is a view similar to FIG. 4 of a fourth form of the invention.

Referring now to FIG. 6, the inner layer 40 bears a rectangular pattern of bosses 42, with holes 43 for cooling air each centered between four adjacent bosses 42. This structure is distinguished by an attaching member 44 which includes a lattice 46 which fits between the bosses 42 and which is clear of the coolant air holes 43; stems 47 project from alternate intersections of the bars of the lattice 46 through holes in the inner layer 40 for attachment to the core. Obviously, the lattice may be replaced by a number of parallel strips corresponding to the bars running in one direction which make up the lattice 46 of FIG. 6.

There may well be advantages in convenience of assembly of the entire structure in providing some sort of lattice or interconnecting structure so that a considerable number of the stems 47 may be put into place in a single operation.

Figure 7:
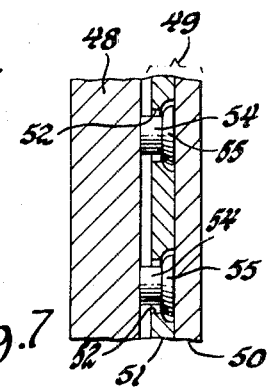
FIG. 7 is a view similar to FIG. 2 illustrating a further modified structure.

As previously mentioned, structures according to my invention may be employed not only for mounting transpiration cooled airfoil facings, but also for mounting any facing onto a core or base. FIG. 7 is a view similar to FIG. 2 but showing a nonpervious two layer facing mounted on a core. In FIG. 7 the base or core 48 mounts a facing 49 made up of an outer layer 50 and an inner layer 51. The outer layer is continuous and without pores; the inner layer has holes 52 through which the stems 54 of any suitable attachment member extend for fixation to the core 4. As illustrated, the outer portion of the holes 52 are enlarged to provide a clearance for the heads 55 of the attachment members and trap the attachment members in the facing. Except for the elimination of the holes for cooling air, this structure may be the same as that illustrated in FIGS. 2 and 3. Cooling air may be caused to flow through channels in the outer surface of the core for convection cooling of the blade if desired.

It should be apparent from the foregoing that structures according to the invention provide a very feasible and suitable arrangement for providing a heat resistant facing on a supporting base and particularly a very suitable means for attachment of a porous facing to a core to define a high temperature airfoil for a turbine.

The detailed description of the preferred embodiment of the invention for the purpose of explaining the principles thereof is not to be considered as limiting or restricting the invention, since many modifications may be made by the exercise of skill in the art without departing from the scope of the invention.

I claim:

1. A laminated material adapted for use in environments of high and variable temperature comprising, in combination, a rigid supporting base; a laminated facing disposed over and adjacent to the base, the facing comprising an inner layer and at least one layer overlying and bonded to the inner layer; and attaching members mounting the facing on the base; the inner layer having through holes and the attaching members having stems extending through the holes and heads trapped between the layers, the stems being bonded to the base and the facing providing a clearance around the heads for limited movement of the facing generally parallel to the surface of the facing to accommodate relative thermal expansion and contraction of the facing and base.

2. A material as defined in claim 1 in which the facing is impervious.

3. A material as defined in claim 1 in which the facing is of a porous structure adapted for transpiration cooling.

4. A material as defined in claim 1 in which the base defines channels on its face adjacent the facing for flow of a cooling medium.

5. A material as defined in claim 1 including means joining the attaching members into aggregates of a plurality of attaching members, the said means being disposed between the inner and overlying layers.

6. A flow-directing blade structure comprising, in combination, a hollow airfoil defined by a laminated sheet having an inside layer and at least one layer external to the inside layer bonded to the inside layer, the said layers being mutually spaced over substantial areas to define at least one interlayer cavity; a core extending spanwise of the airfoil effective to support the said sheet; and attachment members effective to connect the sheet to the core, each attachment member including a head caged in the said interlayer cavity and a stem fixed to the core, the inside layer having openings through which the stems extend, the attachment members having clearance from the laminated sheet so as to allow some relative sliding of the sheet and core resulting from differential expansion.

7. A blade structure as defined in claim 6 in which the sheet is a porous structure adapted for transpiration cooling.

8. A blade structure as defined in claim 6 in which the core defines channels in its outer face extending spanwise of the blade.

* * * * *